United States Patent [19]  [11] Patent Number: 4,836,372
Shelton  [45] Date of Patent: Jun. 6, 1989

[54] NON-FLAGGING COLLATED NAIL STRIP
[75] Inventor: Lawrence S. Shelton, Morton Grove, Ill.
[73] Assignee: Paslode Corporation, Lincolnshire, Ill.
[21] Appl. No.: 242,594
[22] Filed: Sep. 12, 1988
[51] Int. Cl.⁴ .......................................... B65D 85/24
[52] U.S. Cl. .................................. 206/344; 206/343; 206/345; 411/442
[58] Field of Search ............... 206/338, 343, 344, 345, 206/813; 411/442, 443

[56] References Cited
U.S. PATENT DOCUMENTS

| | | | |
|---|---|---|---|
| 159,777 | 2/1825 | Sturtevant | 206/345 |
| 3,276,576 | 10/1966 | Langas et al. | 206/344 |
| 3,828,924 | 8/1974 | Perkins | 206/343 |
| 3,851,759 | 12/1974 | Young et al. | 206/338 |
| 3,861,527 | 1/1975 | Perkins | 206/344 |
| 4,343,579 | 8/1982 | Shelton | 411/442 |

Primary Examiner—David T. Fidei
Attorney, Agent, or Firm—Thomas W. Buckman; Neal C. Johnson

[57] ABSTRACT

A strip of collated nails for use with a rapidly acting, nail-driven tool. The shank of each nail has a cylindrical portion adjoining the head and a ringed portion and having an axial array of annular rings of an outer diameter greater than the diameter of the cylindrical portion. The nails are collated by a pair of tapes, each tape extending across and being adhered to a respective one of diametrically opposed areas on the cylindrical portion of the shank of each nail by an adhesive layer. Each tape and the adhesive layer adhering such tape have a combined thickness covering, on one side of the nail shanks, less than one-half of the difference between outer diameter of the rings and the diameter of the cylindrical portion or cylindrical portions, whereby a nail driven from the strip into a workpiece tends to carry into the workpiece, along with the driven nail, such portions of the tapes and the adhesive layers as are torn from the strip with the driven nail.

10 Claims, 1 Drawing Sheet

NON-FLAGGING COLLATED NAIL STRIP

BACKGROUND OF THE INVENTION

This invention pertains to a strip of collated nails for use with a pneumatically powered, combustion-powered, or other rapidly acting, nail-driving tool.

This invention provides a surprisingly simple solution to a particularly vexing problem, viz., the flagging problem, particularly in a context of ring-shanked, threaded, barbed, and other special-purpose nails.

Flagging occurs when a fragment of wire, paper tape, or other collating material becomes caught under the head of a nail driven from a stack of collated nails into a workpiece by a rapidly acting, nail-driving tool. Besides the fragment being unacceptable from an aesthetic standpoint, the fragment prevents the nail from being driven fully into the workpiece and can present a safety hazard if the fragment flies off the workpiece. The flagging problem is exacerbated with siding nails, roofing nails, dry-wall nails, and other special-purpose nails that remain visible.

Many special-purpose nails for use in rapidly acting, nail-driving tools are ring-shanked, i.e., provided with axial arrays of annular or spiral rings on their shanks, which have cylindrical portions between their heads and those arrays of such rings.

Some prior collating methods are exemplified in Sturtevant U.S. Pat. No. 159,777, which discloses interwoven metallic strands collating sole-fastenings of different types, some of which appear to have annular rings on their shanks, Langas et al. U.S. Pat. No. 3,276,576, which discloses adhesive tapes collating common nails having full heads, Young et al. U.S. Pat. No. 3,851,759, which discloses swaged wires collating nails with D-shaped, so-called clipped heads, and Shelton et al. U.S. Pat. No. 3,966,042, which discloses plastic elements collating nails with D-shaped heads.

SUMMARY OF THE INVENTION

This invention addresses the flagging problem in a context of special-purpose nails, as described above, and provides a strip of collated nails for use with a pneumatically powered, combustion-powered, or other rapidly acting, nail-driving tool.

Broadly, this invention provides a strip of collated nails, e.g., special-purpose nails, wherein each nail has a head and a shank, which comprises, as measured across the strip, a relatively thin portion adjoining the head and, as measured similarly, a relatively thick portion spaced from the head at least by the relatively thin portion. Typically, the shanks of such nails are cylindrical; however, the shanks of such nails may be otherwise shaped in cross section, e.g., square in cross section.

According to this invention, the nails are collated by at least one elongate element extending across the shanks of the nails and being adhered to an area over the relatively thin portion of the shank of each nail, preferably by a pair of such elements, each elongate element being adhered to a respective one on opposite areas on the relatively thin portion of the shank of each nail.

As a distinction over prior collating methods, each elongate element has, as measured across the strip, a thickness covering, on one side of the shanks of the nails, less than one-half of the difference in thickness between the relatively thin and relatively thick portions of the shanks, whereby a nail driven from the strip into a workpiece tends to carry into the workpiece, along with the driven nail, such portions of each elongate member as are torn from the strip with the driven nail.

If the nails are ring-shanked, each nail has a head and a shank, which comprises a cylindrical portion adjoining the head and being of a given diameter and a ringed portion adjoining the cylindrical portion so as to be axially spaced from the head by the cylindrical portion and having an axial array of annular, spiral, or other rings of an outer diameter greater than the diameter of the cylindrical portion.

Preferably, the nails are collated by a pair of tapes, and each tape extends across the cylindrical portions of the nail shanks and is adhered to a respective one of diametrically opposed areas on the cylindrical portion of the shank of each nail by an adhesive layer between such tape and the nail shanks.

Thus, each tape and the adhesive layer adhering such tape have a combined thickness covering, on one side of the nail shanks, less than one-half of the difference between the outer diameter of the rings and the diameter of the cylindrical portions of the shanks, whereby a nail driven from the strip into a workpiece by the nail-driving tool tends to carry into the workpiece, along with the driven nail, such portions of the tapes and the adhesive layers as are torn from the strip with the driven nail.

This invention may be also embodied in a strip of collated nails in which each nail has a head and a shank, and in which the shank of each nail comprises a first cylindrical portion adjoining the head and being of a given diameter, a first ringed portion adjoining the first cylindrical portion so as to be axially spaced from the head by the first cylindrical portion and having an axial array of annular, spiral, or other rings of an outer diameter greater than the diameter of the first cylindrical portion, a second cylindrical portion adjoining the first ringed portion so as to be axially spaced spaced from the first cylindrical portion by the first ringed portion and being of the same diameter as the first cylindrical portion, and a second ringed portion adjoining the second cylindrical portion so as to be axially spaced from the first ringed portion by the second cylindrical portion and having an axial array of annular, spiral, or other rings of the same outer diameter as the first ringed portion, the nails being collated by a first pair of tapes and by a second pair of tapes. Each tape of the first pair extends across the first cylindrical portion of the shank of each nail and is adhered to a respective one of diametrically opposed areas on the first cylindrical portion of the shank of each nail by an adhesive layer between such tape and the shanks of the nails. Each tape of the second pair extends across an is adhered to a respective one of diametrically opposed areas on the second cylindrical portion of the shank of each nail by an adhesive layer between such tape and the shanks of the nails.

As a distinction over prior collating methods for ring-shanked nails, each tape and the adhesive layer adhering such tape in a strip of collated nails according to the preceding paragraph have a combined thickness covering, on one side of the nail shanks, less than one-half of the difference between the outer diameter of the rings and the diameter of the cylindrical portions of the shanks, whereby a nail driven from the strip into a workpiece by the nail-driving tool tends to carry into the workpiece, along with the driven nail, such portions of the tapes and adhesive layers as are torn from the strip with the driven nail.

As an enhancement, whether one pair of tapes is used or two pairs of tapes are used, the tapes may be tapered so as to be thicker where nearer to the nail heads and thinner where farther from the nail heads.

Preferably, whether one tape, one pair of tapes, or two pairs of tapes are used, each tape is provided with an array of longitudinal grooves. Such grooves provide enhanced holding capacity.

These and other objects, features, and advantages of this invention are evident from the following description of embodiments of this invention with reference to the accompanying drawing.

DETAILED DESCRIPTION OF ILLUSTRATED EMBODIMENTS

Figure 1:
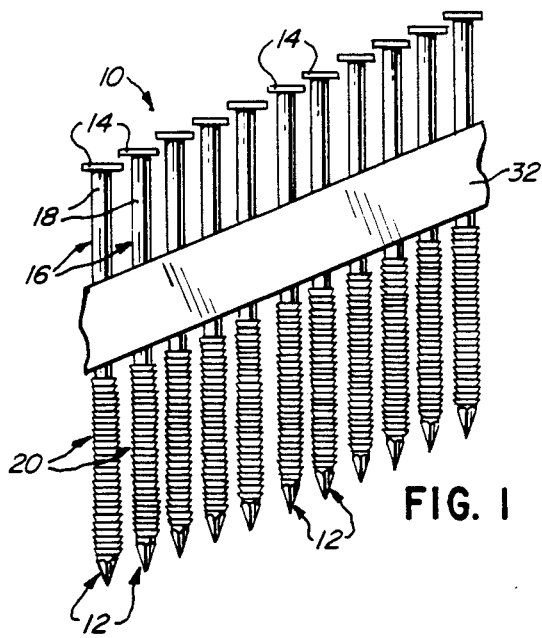
FIG. 1 is an elevational view of one side of a stack of collated nails constituting a preferred embodiment of this invention.
Figure 2:
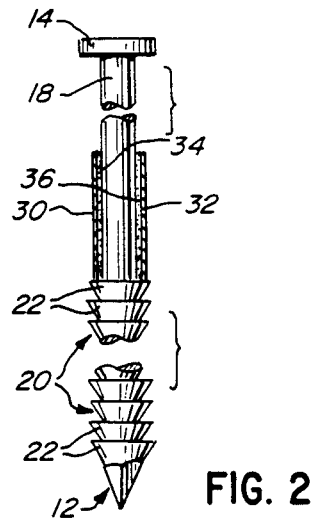
FIG. 2 is an cross-sectional view of the stack of FIG. 1, as taken between two nails of the stack.

As shown in FIGS. 1 and 2, a stack 10 of collated nails 12 for use in a pneumatically powered, combustion-powered, or other rapidly acting, nail-driving tool (not shown) constitutes a preferred embodiment of this invention.

The nails 12 are ring-shanked, each having a head 14 and a shank 16, which comprises a cylindrical portion 18 adjoining the head 14 and being of a given diameter and a ringed portion 20 adjoining the cylindrical portion 18 so as to be axially spaced from the head 14 by the cylindrical portion 18 and having an axial array of annular rings 22 (see FIG. 2) of an outer diameter greater than the diameter of the cylindrical portion 18. Thus, the nails 12 may be siding nails, roofing nails, dry-wall nails, or other special-purpose nails.

The nails 12 are collated by a pair of tapes 30, 32, each tape extending across the cylindrical portions 18 of the nail shanks 16 and being adhered to a respective one of diametrically opposed areas on the shank 16 of each nail 12. The tape 30 is adhered to the cylindrical portion 18 of the shank 16 of each nail 12 by a layer 34 of heat-sensitive adhesive between the tape 39 and the nail shanks 16. The tape 32 is adhered to the cylindrical portion 18 of the shank 16 of each nail 12 by a layer 36 of such adhesive between the tape 32 and the nail shanks 16.

Figure 7:
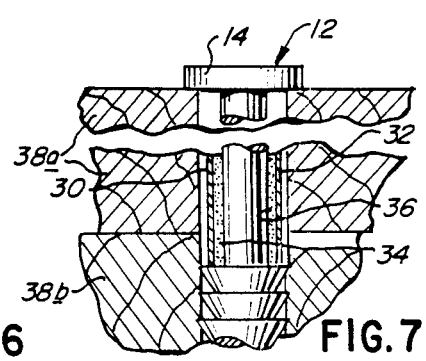
FIG. 7 is a similarly enlarged, fragmentary, cross-sectional view of a two-part workpiece, into which a nail from the stack of FIG. 1 has been driven, along with portions of the collating material.

The tape 30 and the adhesive layer 34 have a combined thickness covering, on one side of the nail shanks 16, less than one-half of the difference between the outer diameter of the rings 22 on the nail shanks 16 and the diameter of the cylindrical portions 18 of the nail shanks 16. The tape 32 and the adhesive 36 have the same combined thickness. In other words, the tape 30, the adhesive layer 34, the tape 32, and the adhesive layer 36 have a combined thickness covering, on both sides of the nail shanks 16, less than the total difference therebetween. Thus, as shown in FIG. 7, a nail 12 driven from the strip 10 into a composite, i.e., two-part workpiece 38a, 38b, by a rapidly acting, nail-driving tool, as discussed above, tends to carry into the workpiece 38a, 38b, along with the driven nail 12, such portions of the tapes 30, 32, and the adhesive layers 34, 36, as are torn from the strip 10 with the driven nail 12.

Preferably, each of the tapes 30, 32 is a polymeric-paper laminate with a top coating for enhanced lubricity and holding capability.

Figure 5:
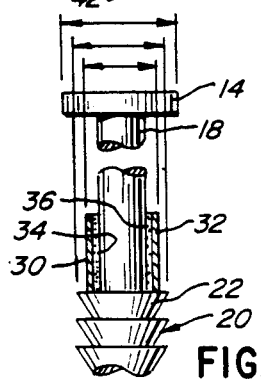
FIG. 5 is an enlarged detail of the nail stack of FIG. 1, as shown in FIG. 2, with relative diameters of different elements being shown by double-headed arrows.
Figure 6:
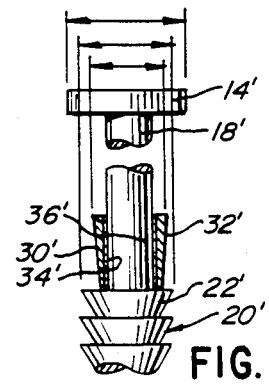
FIG. 6 is an analogous detail of a modified form of the nail stack with relative diameters being shown analogously.

As an enhancement shown in FIG. 6, in which elements having primed reference numbers correspond to elements having unprimed reference numbers in FIG. 5, the tapes 30', 32', may be tapered so as to be thicker where nearer to the nail heads 14' and thinner where farther from the nail heads 14'.

Figure 3:
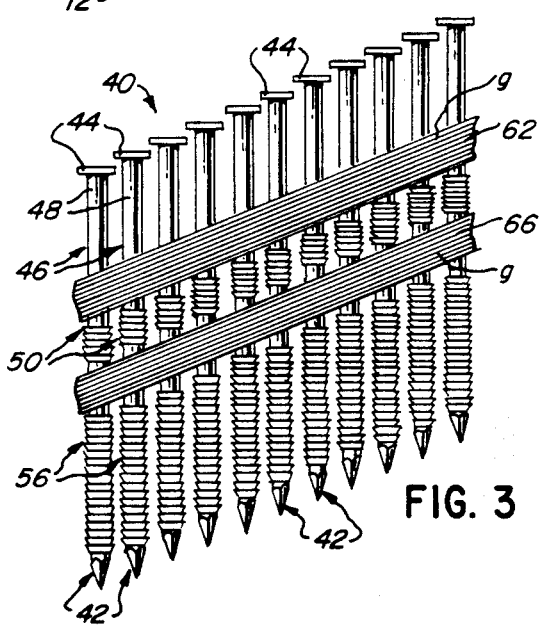
FIG. 3 is an elevational view of one side of a stack of collated nails constituting an alternative embodiment of this invention.
Figure 4:
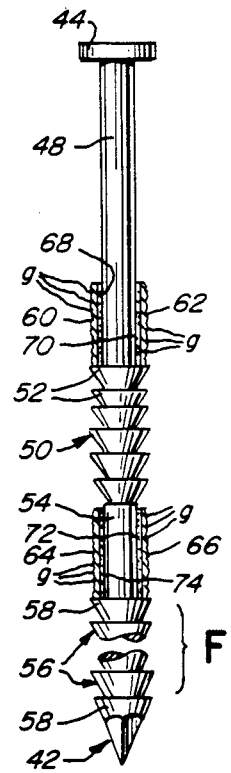
FIG. 4 is a cross-sectional view of the stack of FIG. 3, as taken between two nails of the stack.

As shown in FIGS. 3 and 4, a stack 40 of collated nails 42 for use in a rapidly acting, nail-driving tool, as discussed above, constitutes an alternative embodiment of this invention.

The nails 42 are ring-shanked, each having a head 44, and a shank 46, which comprises a first cylindrical portion 48 adjoining the head 44 and being of a given diameter, a first ringed portion 50 adjoining the first cylindrical portion 48 so as to be axially spaced from the head 44 by the first cylindrical portion 48 and having an axial array of annular rings 52 (see FIG. 4) of an outer diameter greater than the diameter of the first cylindrical portion 48, a second cylindrical portion 54 (see FIG. 4) adjoining the first ringed portion 50 so as to be axially spaced from the first cylindrical portion 48 by the first ringed portion 50 and being of the same diameter as the first cylindrical portion 48, and a second ringed portion 56 adjoining the second cylindrical portion 54 so as to be axially spaced from the first ringed portion 50 by the second cylindrical portion 56 and having an axial array of annular rings 58 (see FIG. 4) of the same outer diameter as the rings 52 of the first ringed portion 50.

The nails are collated by a first pair of tapes 60, 62, and by a second pair of tapes 64, 66, each tape of the first pair extending across the first cylindrical portion 48 of the nail shanks 46 and being adhered to a respective one of diametrically opposed areas on the first cylindrical portions 48 of the nail shanks 46, and each tape of the second pair extending across the second cylindrical portions 54 of the nail shanks 46 and being adhered to a respective one of diametrically opposed areas on the second cylindrical portions 54 of the nail shanks 46. The tape 60 is adhered to the first cylindrical portion 48 of the shank 46 of each nail 42 by a layer 68 of heat-sensitive adhesive between the tape 60 and the nail shanks 46. The tape 62 is adhered to the first cylindrical portion 48 of the shank 46 of each nail 42 by a layer 70 of such adhesive between the tape 62 and the nail shanks 46. The tape 64 is adhered to the second cylindrical portion 54 of the shank 46 of each nail 42 by a layer 72 of such adhesive between the tape 66 and the nail shanks 46. The tape 66 is adhered to the second cylindrical portion 54 of the shank 46 of each nail 42 by a layer 74 of such adhesive between the tape 68 and the nail shanks 46.

The tape 60 and the adhesive layer 68 have a combined thickness covering, on one side of the nail shanks 46, less than one-half of the difference between the outer diameter of the rings 52 on the nail shanks 46. The tape 62 and the adhesive layer 70, the tape 64 and the adhesive layer 72, and the tape 66 and the adhesive layer 74, respectively, have the same combined thickness. In other words, the tape 60, the adhesive layer 68, the tape 62, and the adhesive layer 70 have a combined thickness, covering, on both sides of the nail shanks 46, less than the total difference therebetween. Likewise, the tape 64, the adhesive layer 72, the tape 66, and the adhesive layer 74 have a combined thickness, covering, on both sides of the nail shanks 46, less than the total difference therebetween. Thus, in a manner analogous to what is shown in FIG. 7, a nail 42 driven from the strip 40 into a composite workpiece (not shown) by a rapidly acting, nail-driving tool, as discussed above, tends to carry into the workpiece, along with the driven nail 42, such portions of the tapes 60, 62, and the adhesive layers 68, 70, and such portions of the tapes 64, 66, and the adhesive layers 72, 74, as are torn from the strip 40 with the driven nail 42.

As shown, each of the tapes 60, 62, and each of the tapes 64, 66, is provided with an array of longitudinal groves g for enhanced holding capability. Preferably, moreover, each of the tapes 60, 62, and each of the tapes 64, 66, is a polymeric-paper laminate with a top coating for enhanced lubicity and holding capability.

As an enhancement similar to what is shown in FIG. 6, the four tapes may be tapered so as to be thicker where nearer to the nail heads 44 and thinner where farther from the nail heads 44.

Although nails having full heads are shown in the drawings, nails having D-shaped, so-called clipped heads (see, e.g., Young et al. U.S. Pat. No. 3,851,759 and Shelton et al. U.S. Pat. No. 3,966,042) may be instead used. Such clipped heads allow the nail-to nail spacing to be substantially reduced and the amount of collating material to be correspondingly reduced, which further alleviates the flagging problem.

Other modifications may be made to the collated nail strip of either embodiment described above without departing from the scope and spirit of this invention.

I claim:

1. A strip of collated nails, each nail having a head and a shank, which comprises a cylindrical portion adjoining the head and being of a given diameter and a ringed portion adjoining the cylindrical portion so as to be axially spaced from the head by the cylindrical portion and having an axial array of rings of an outer diameter greater than the diameter of the cylindrical portion, the nails being collated by a pair of tapes, each tape extending across the shanks of the nails and being adhered to a respective one of diametrically opposed areas on the cylindrical portion of the shank of each nail by an adhesive layer between such tape and the shanks of the nails, each tape and the adhesive layer adhering such tape having a combined thickness covering, on one side of the shanks of the nails, less than one-half of the difference between the outer diameter of the rings and the diameter of the cylindrical portions of the shanks, whereby a nail driven from the strip into a workpiece tends to carry into the workpiece, along with the driven nail, such portions of the tapes and the adhesive layers as are torn from the strip with the driven nail.

2. The strip of collated nails of claim 1 wherein the tapes are tapered so as to be thicker where nearer to the heads of the nails and thinner where farther from the heads of the nails.

3. A strip of collated nails, each nail having a head and a shank, which comprises a first cylindrical portion adjoining the head and being of a given diameter, a first ringed portion adjoining the first cylindrical portion so as to be axially spaced from the head by the first cylindrical portion and having an axial array of rings of an outer diameter greater than the diameter of the first cylindrical portion, a second cylindrical portion adjoining the first ringed portion so as to be axially spaced from the first cylindrical portion by the first ringed portion and being of the same diameter as the first cylindrical portion, and a second ringed portion adjoining the second cylindrical portion so as to be axially spaced from the first ringed portion by the second cylindrical portion and having an axial array of rings of the same outer diameter as the rings of the first ringed portion, the nails being collated by a first pair of tapes and by a second pair of tapes, each tape of the first pair extending across the first cylindrical portion of the shank of each nail and being adhered to a respective one of diametrically opposed areas on the first cylindrical portion of the shank of each nail by an adhesive layer between such tape and the shanks of the nails, each tape of the second pair extending across the second cylindrical portion of the shank of each nail and being adhered to a respective one of diametrically opposed areas on the second cylindrical portion of the shank of each nail by an adhesive layer between such tape and the shanks of the nails, each tape and the adhesive layer adhering such tape having a combined thickness covering, on one side of the shanks of the nails, less than the one-half of the difference between the outer diameter of the rings and the diameter of the cylindrical portions of the shanks, whereby a nail driven from the strip into a workpiece tends to carry into the workpiece, along with the driven nail, such portions of the tapes and the adhesive layers as are torn from the strip with the driven nail.

4. The strip of collated nails of claim 3 wherein the tapes are tapered so as to be thicker where nearer to the heads of the nails and thinner where farther from the heads of the nails.

5. A strip of collated nails, each nail having a head and a shank, which comprises, as measured across the strip, a relatively thin portion adjoining the head and, as measured across the strip, a relatively thick portion spaced from the head at least by the relatively thin portion, the nails being collated by at least one elongate element extending across the shanks of the nails and being adhered to an area on the relatively thin portion of the shank of each nail, the elongate element having, as measured across the strip, a thickness covering, on one side of the shanks of the nails, less than one-half of the difference in thickness between the relatively thin and relatively thick portions of the shanks, whereby a nail driven from the strip into a workpiece tends to carry into the workpiece, along with the driven nail, such portions of the elongate element as are torn from the strip with the driven nail.

6. The strip of collated nails of claim 5 wherein the elongate element comprises a tape and an adhesive layer adhering the tape to the shanks of the nails.

7. The strip of collated nails of claim 6 wherein the tape is provided with an array of longitudinal grooves.

8. A strip of collated nails, each nail having a head and a shank, which comprises, as measured across the strip, a relatively thin portion adjoining the head and, as measured across the strip, a relatively thick portion, spaced from the head at least by the relatively thin portion, the nails being collected by a pair of elongate elements, each elongate element extending across the shanks of the nails and being adhered to a respective one of opposed areas on the relatively thin portion of the shank of each nail, each elongate element having, as measured across the strip, a thickness covering, on one side of the shanks of the nails, less than one-half of the difference in thickness measured across the strip between the relatively thin and relatively thick portions of the shanks, whereby a nail driven from the strip into a workpiece tends to carry into the workpiece, along with the driven nail, such portions of the elongate elements as are torn from the strip with the driven nail.

9. The strip of collated nails of claim 8 wherein each elongate element comprises a tape and an adhesive layer adhering the tape to the shanks of the nails.

10. The strip of collated nails of claim 9 wherein each tape is provided with an array of longitudinal grooves.

* * * * *